US006938414B1

(12) United States Patent
Bruun

(10) Patent No.: US 6,938,414 B1
(45) Date of Patent: Sep. 6, 2005

(54) HYDRAULIC POWERED ARM SYSTEM WITH FLOAT CONTROL

(75) Inventor: Lars Bruun, Filipstad (SE)

(73) Assignee: Bruun Ecomate Aktiebolag, Filipstad (SE)

( * ) Notice: Subject to any disclaimer, the term of this patent is extended or adjusted under 35 U.S.C. 154(b) by 25 days.

(21) Appl. No.: 10/486,236

(22) PCT Filed: Jun. 19, 2002

(86) PCT No.: PCT/SE02/01184

§ 371 (c)(1),
(2), (4) Date: Feb. 9, 2004

(87) PCT Pub. No.: WO03/023234

PCT Pub. Date: Mar. 20, 2003

(30) Foreign Application Priority Data

Sep. 7, 2001 (SE) .................................... 0102986

(51) Int. Cl.[7] ............................................... F16D 31/02
(52) U.S. Cl. ............................. 60/414; 60/494; 60/464
(58) Field of Search .......................... 60/414, 464, 478, 60/481, 494

(56) References Cited

U.S. PATENT DOCUMENTS 4,646,518 A * 3/1987 Hochsattel .................... 60/413
5,560,733 A * 10/1996 Dickinson .................... 60/478
6,584,769 B1 * 7/2003 Bruun .......................... 60/414
6,789,387 B2 * 9/2004 Brinkman ..................... 60/414
6,804,957 B2 * 10/2004 Bruun .......................... 60/414

FOREIGN PATENT DOCUMENTS

WO WO 00/00748 1/2000
WO WO 01/48387 7/2001

OTHER PUBLICATIONS

Copy of International Search Report.

* cited by examiner

*Primary Examiner*—Edward K. Look
*Assistant Examiner*—Michael Leslie
(74) *Attorney, Agent, or Firm*—Michael Bednarek; Pillsbury Winthrop Shaw Pittman LLP

(57) ABSTRACT

The present invention relates to a hydraulically powered arm system with a hydraulic circuit, which hydraulic circuit (L) comprises a pressure source (6) and a lifting cylinder (1) arranged to an arm which is intended for handling a tool, said hydraulic circuit (L) comprising a partial circuit (45A, 45B), which can be connected into communication with said pressure cource (6) by means of a first valve element (44) and said lifting cyliner (1) by means of a second valve element (43), characterised in that said partial circuit (45A, 45B) comprises a pressure reducing/relieving unit (4) whichis arranged between said valve elements (43, 44), and that said pressure reducing/relieving unit (4) is controlled by a pressure controlling unit (62A) in order to facilitate float control of the tool attached to the arm system, whereby a controlled ground pressure is obtained during the a floating motion.

7 Claims, 1 Drawing Sheet

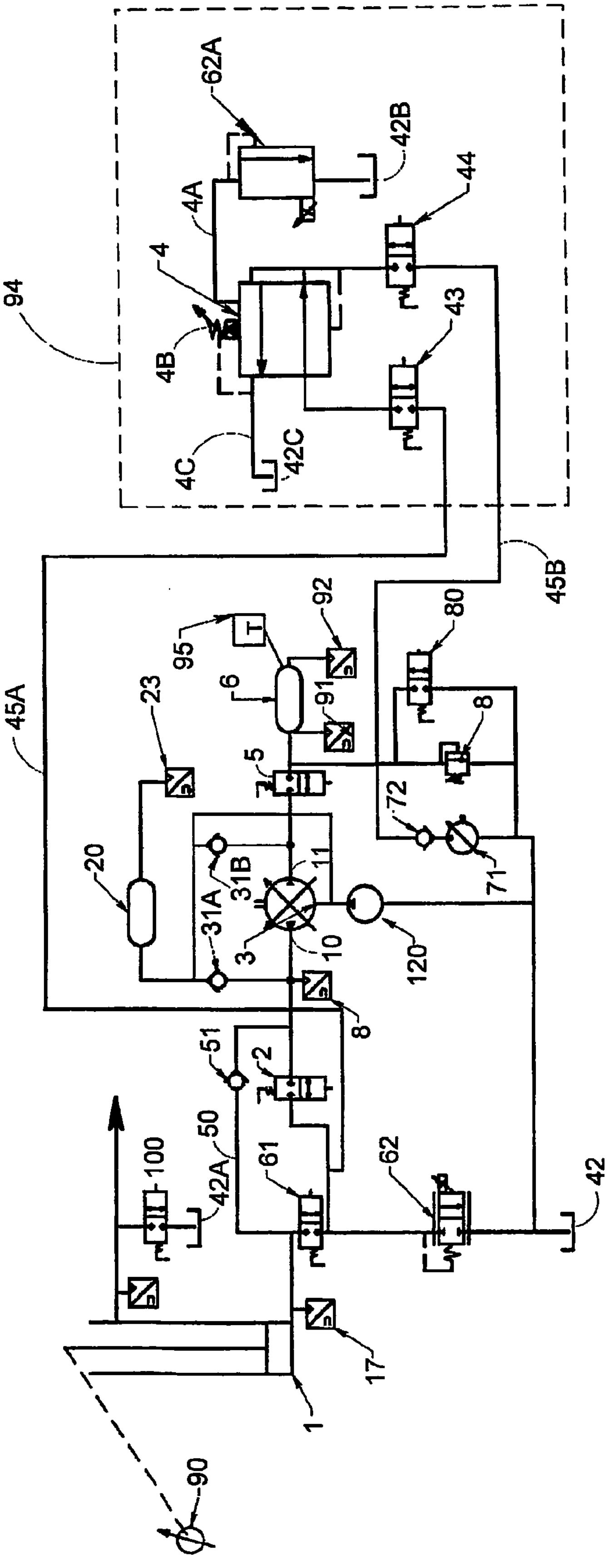
94
62A
42B
4A
4
44
4B
43
4C
42C
45A
45B
23
20
95
T
6
92
91
5
80
8
72
71
31A
31B
11
3
10
120
51
2
50
42A
100
61
62
42
17
1
90

HYDRAULIC POWERED ARM SYSTEM WITH FLOAT CONTROL

The present invention relates to a hydraulically powered arm system with a hydraulic circuit, which hydraulic circuit comprises a pressure source and a lifting cylinder arranged to an arm which is intended for handling a tool, said hydraulic circuit comprising a partial circuit, which can be connected into communication with said pressure source by means of a first valve element and said lifting cylinder by means of a second valve element, in order to facilitate floating control of the arm system.

DESCRIPTION OF PRIOR ART AND PROBLEMS

Excavators, and similar machines, having a hydraulically powered arm system, have the possibility to achieve a so called floating motion. During the floating motion, the tool (a bucket for an excavator) is pulled along the ground surface using the dead weight of the arm system as the force by which the tool effects the ground surface. In case of an excavator, this is achieved by means of allowing the lifting cylinder be connected to tank, i.e. without being pressurized, and merely work with the hydraulic cylinder between the boom and the stick. The incontrollable ground pressure implies that the tool sometimes is subject to larger load than desired, which may lead to exaggerated wear and in the worst case to damages. Moreover, a floating motion that is performed in this traditional manner provides a varying ground pressure, as the influence/moment of the dead weight varies with the position of the arm system. It is evident that in many cases it would be desirable to obtain substantially the same ground pressure along the entire floating motion, which is normally performed in an inward direction.

BRIEF DISCLOSURE OF THE INVENTION

An object of the invention is to eliminate or at least minimize the above mentioned drawbacks, which object is achieved by a hydraulically powered arm system with a hydraulic circuit, which hydraulic circuit comprises a pressure source and a lifting cylinder arranged to an arm which is intended for handling a tool, said hydraulic circuit comprising a partial circuit, which can be connected into communication with said pressure source by means of a first valve element and said lifting cylinder by means of a second valve element, wherein said partial circuit comprises a pressure reducing/relieving unit, which is arranged between said valve elements, and that a pressure controlling unit for control of said pressure reducing/relieving unit in order to facilitate float control of the tool attached to the arm system, whereby a controlled ground pressure is obtained during the a floating motion.

Thanks to the invention, a floating control may be achieved, where the ground pressure may be chosen within a certain range, such that an undesired exaggerated load on the tool attached to the arm system may in principle be eliminated.

The invention is especially advantageous when used in connection with a mobile handling device according PCT/SE99/01131, which discloses a hydraulic circuit comprising an accumulator system, by means of which a considerable amount of recovery of the energy for the lowering load may be achieved, since the accumulator in such a circuit in principle makes it impossible to use traditional floating control.

According to further aspects of the invention:

said pressure reducing/relieving unit comprises a reducing/relieving valve, which preferably is formed as an integral unit, said pressure controlling unit comprises a proportional valve, said proportional valve receives signals directly or indirectly from a control device handled by the operator, such that the level of the pressure against the ground may be chosen within a certain range, said proportional valve is controlled by a control unit, which besides signals from said control device also receives signals from a position sensor, whereby an automatic compensation for the position of the arm is achieved in order to obtain a substantially constant level of the pressure against the ground during a floating motion, said pressure source comprises an accumulator, said accumulator is included in a circuit for recovering and recycling, respectively, of lowering load energy, the hydraulic circuit also comprising a variable hydraulic machine with two ports, said hydraulic machine being able to give full system pressure in two flow directions to said ports, wherein one of the ports is connected to said accumulator and the other port is connected to said lifting cylinder.

BRIEF DESCRIPTION OF THE DRAWING

The invention will be described below more in detail with reference to the enclosed drawing, in which a hydraulic circuit according to the invention is schematically shown.

DETAILED DESCRIPTION

FIG. 1 shows a hydraulic scheme for a lifting cylinder in a hydraulic circuit, which to essential parts coincides with what is shown in PCT/SE00/02360 and which is further supplemented according to the invention. A double-acting hydraulic cylinder 1, a variable reciprocating pump 3 (which is called a hydraulic machine below) and an accumulator assembly 6 are shown, which will be described more in detail below. The hydraulic circuit is disposed in an excavator, the lifting cylinder 1 thus being provided to carry out vertical work of the arm which carries the bucket on the excavator. Disposed between the lifting cylinder 1 and the hydraulic machine 3 is a logic element 2, in the form of a stop valve, which is spring-loaded and which in its uninfluenced state breaks the connection between the hydraulic machine 3 and the lifting cylinder 1. In its activated position, the valve device 2 gives open communication between the hydraulic machine 3 and the lifting cylinder 1. (This logic element 2 also may function as a hose-rupture safety device.) A similar logic element 5 is disposed between the accumulator 6 and the hydraulic motor 3, with a function similar to the first-mentioned logic element 2. This too is in the form of a stop valve 2. The operation of the hydraulic machine takes place in a manner known per se via a suitable transmission, and preferably through a fuel-based engine D.

The hydraulic machine 3 is a variable reciprocating pump which can both receive and emit oil at the ports 10, 11. The pump is of a known type which permits full system pressure at both outlet ports and in which the flow can be adjusted from zero to maximum by means of the variable setting, which is normally achieved by means of a so-called swash plate. Using a pump of this kind eliminates the need to regulate the circuit via a control valve, whereby a considerable simplification is achieved at the same time as control losses are reduced.

A safety valve 8 is provided in the system between the accumulator 6 and a tank 42, which ensures that a certain maximum pressure for the circuit is not exceeded. Moreover, there is a hose-rupture safety valve 61 arranged in the circuit before the logic element 2.

A pressure-sensing element 17 is provided to register the pressure in the line between the lifting cylinder 1 and the logic element 2. In the event of a lowering motion which requires power, the pressure-sensing element 17 will register that the pressure is below that required for the function and ensure that oil is supplied to the bar side of the lifting cylinder. The purpose of the pressure-sensing element 17 is thus to ensure that the hydraulic machine 3 controls the flow down to zero, when the hydraulic cylinder no longer has any pressure, e.g. when the bucket has reached the ground level.

The system functions in principle such that in the event of a lifting motion, the operator will send a control signal which will ensure that the valves 2 and 5 open. The connection between the accumulator 6, hydraulic machine 3 and lifting cylinder 1 is thus completely open. The pressurized oil in the accumulator 6 flows then to the variable hydraulic machine 3, which conveys the oil onwards to the lifting cylinder 1. If the pressure in the accumulator in this case is higher than that required to carry out the work using the lifting cylinder 1, the surplus energy may be supplied by the hydraulic machine 3 to the drive system. If the accumulator pressure should not be quite sufficient, the variable hydraulic machine 3 provides a pressure increase to reach the requisite pressure level, which is achieved by means of power, which is supplied via the engine D of the handling machine. Thus in such a situation only as much energy is supplied as is required to overcome the pressure difference between the accumulator and the lifting cylinder's requirement. In the event of a lowering movement, the direction of flow in the pump is changed and oil is supplied at port 10 and emitted at port 11 to be supplied to the accumulator 6. If the pressure in the accumulator 6 is then lower than at the lifting cylinder 1, the variable hydraulic machine 3 will be able to supply energy. If on the other hand the pressure in the accumulator is higher than in the lifting cylinder, additional energy from the engine D will need to be supplied to the variable hydraulic machine 3 to obtain a lowering movement. However, this energy supplied is stored in the accumulator 6 and is therefore accessible in connection with the next lifting movement. It is evident from the above that the system is energy-saving and eliminates heat-generating throttling of the oil flow which normally occurs when the lowering energy is handled in conventional systems.

Further, a proportional valve 62 is shown, which allows small lowering motions without utilizing the hydraulic machine 3, and which valve also increases the capacity of the lowering motion when the hydraulic machine reaches its maximal capacity.

Further, the system is controlled by a control system 94, below called the computer 94, which suitably obtains information from sensors i.a. regarding pressure 91 and 92, respectively, position 90, and the rotation speed of the engine.

When lowering the lifting cylinder, the major portion of the oil will be pumped to the accumulator system 6, but when the arm system suddenly is relieved, when the bucket for instance hits the ground, the pressure sensor 17 in the lifting circuit must emit a signal to the computer 94 to justify the pumping capacity downwards. During the transient time of the hydraulic machine, it must be supplied with oil in order not to be destroyed (not to seize), and this amount is obtained from the refilling circuit (20, 31A, and 31B, respectively), which instantly may provide the hydraulic machine 3 with oil during the transient time. The refilling circuit comprises an accumulator 20 and non-return valves 31A and 31B, respectively. Said accumulator 20 is preferably loaded by means of a pump 120, which also may give an extra supply to the hydraulic machine in case of a very long transient period, which otherwise could lead to a situation where the amount of oil in the accumulator 20 would not be sufficient.

The hydraulic machine chosen in the system has like all rotating pumps a volumetric loss, which at full flow and pressure may be expected to amount to 5% but at low flows it may be close on 100%, and said loss of liquid must be replaced. It is important to realize that said loss is practically independent of the deflection of the hydraulic machines or its flow. At a lowering motion, the entire amount of oil which is delivered by the lifting cylinder will thus not be found in the accumulator 6 but a portion thereof will run to the tank 42 via the leakage line of the hydraulic machine. Except said leakage, consideration must also be taken to the amount which is drained via the valve 62. It must be possible to control the lowering motion of a machine with great accuracy, and the hydraulic machine 3 does then not give sufficient control. For this reason, there is a valve 62 in the lowering circuit, which allows complete control. A lowering motion will take place only via the valve 62 if small motions or great accuracy are required.

The hydraulic machine 3 has a size which allows full lifting speed, but it will be considerably more expensive to give the hydraulic machine a size which also manages full lowering speed, which is approximately 50% higher, i.e. which should require a flow which is approximately 50% higher. Further, this would imply a considerably extension of the line areas etc. The valve 62 thus has two functions, partly to allow complete control at low lowering speeds, partly to increase the maximal lowering speed at high lowering speeds. Or in other words, the valve 62 allows that a hydraulic machine 3 having considerably low capacity. This control, the sequential control, is performed by the computer 94. When low lowering speeds are desired, the computer does therefore not emit any signal to the hydraulic machine 3 or to the valve 2 and 6 but only to the valve 62. In this way, an exactly controlled motion with immediate response is obtained. In this connection it may be pointed out that the adjusting times of such a hydraulic machine 3 normally are felt too long. When a higher lowering speed is desired, the computer emits a signal to the valves 2 and 5 to open while the hydraulic machine 3 is opened up. When a complete opening of the hydraulic machine 3 has been achieved, the computer emits a signal to the proportional valve 62 to increase the flow to the desired level. The maximal flow via the proportional valve is 50% of the pumping capacity.

In order to solve the problem which arises in connection with the filling of the accumulator 6 with oil to ensure next lifting motion the following details are added. The position sensor 90 of the lifting piston 1 gives a signal to the computer 94, which also receives a signal from the accumulator system 6 by the pressure sensors 91/92. Then the computer 94 calculates the need and emits a signal to the pump 71, which attends to desired/sufficient pressure being established, which in turn determines the amount in the accumulator. Said refilling of the accumulator is thus performed independent of a lowering motion or lifting motion being made or other functions being utilized. Thus, the capacity of the pump 71 only has to be a fraction of the capacity of the hydraulic machine. The reason is that said refilling of the accumulator 6 takes place during the entire operation period of the machine.

According to the invention, the hydraulic circuit L comprises a partial circuit for automatic floating control of the bucket, which implies that the operator in an automatic manner with a in principle constant, chosen ground pressure shall be able to move the bucket along the ground. This partial circuit includes a reducing/relieving valve 4, a second proportional valve 62A, and two logic elements 43 and 44, respectively. The reducing/relieving valve 4, which is preferably formed by an integral unit, comprises a type of slide, which in one direction is influenced by an adjustable (manually) resilient device 4B. The reducing/relieving valve 4 is via a first line 45A and its logic element 43 connected to a line between the hose-rupture safety device 61 and the first mentioned proportional valve 62. Thus, this line 45A is in constant communication with the piston side of the lifting cylinder 1, under the condition that the hose-rupture safety valve 61 is open. The reducing/relieving valve 4 is via a second line 45B and its logic element 44 connected to a line between the accumulator 6 and the logic element 5. Accordingly, this line 45B is constant communication with the accumulator 6. The reducing/relieving valve 4 works in such a manner that it provides for a chosen pressure level independent of flow direction therethrough. When the lifting cylinder 1 moves upwardly, only a pressure reduction takes place, when the oil flows through the valve 4, whereas in the opposition direction, when oil is evacuated out of the lifting cylinder 1, a relieving flow of oil out of reducing/relieving valve 4 to the tank 42C takes place.

The proportional valve 62A is via a line 4A connected to the reducing/relieving valve 4 in such a manner that it provides for an additional force that is controllable/adjustable acting together with the resilient device 4B. The proportional valve 62A has an outlet that leads to a tank 42B. This outlet is merely intended to handle the extremely small flows which are caused by the proportional valve 62A per se. Furthermore, there is an adjustable control device (not shown, e.g. a field regulator, an inductive gauge, a dielectric detector or the like, which is suitably mounted on the switch panel), which may be handled by the operator in order control the level of the proportional valve 62A by means of the computer 94, which valve 62A in turn determines the pressure level for the floating motion. Accordingly, if a high ground pressure is desired during the floating motion, the control device is set on a high level, whereas, if a low ground pressure is desired, it will be set on a low level.

As already mentioned, a pressure sensor 17 and a position sensor 90 (e.g. in-form of a field regulator, an inductive gauge, a dielectric detector or the like) are provided on the lifting cylinder, which sensors continuously emit the pressure and the position, respectively, of the lifting cylinder to the computer 94. By means of this last mentioned information the computer 94 may approximately estimate the position of the arm system, and hence also the moment the dead weight of the arm exerts on the lifting cylinder 1. As a consequence, it will be possible to approximately calculate the static pressure, by means of which the dead weight of the arm effects the pressure in the lifting cylinder 1, whereby the prerequisites for achieving continuous automatic floating control are fulfilled. Since the pressure due to the dead weight continuously changes depending on the position of the arm, this factor has to be calculated if the ground pressure of the bucket shall be kept in principally constant during the floating motion. This is also compensated for in an automatic manner by means of the computer 94 continuously registrating the pressure and the position of the lifting cylinder.

When the operator desires an automatic floating control, he activates a special activator (not shown), e.g. a push button, which directly or indirectly emits a signal to the computer 94, whereby both of the logic units 43, 44 open (the logic units 2, 5 of the basic circuit then have to be closed), such that the reducing/relieving valve 4 via the lines 45A, 45B is connected to the hydraulic system. By means of his control device the operator chooses the desired ground pressure for the floating motion. When the operator thereafter (during an inwardly directed motion) emits an operation signal to pull the arm/bucket towards the machine an automatic adaptation of the pressure within the lifting cylinder 1 will take place, as the oil that flows from accumulator 6 is reduced to the desired pressure level during passage through the reducing/relieving valve 4, whereafter the oil that has been adapted to the chosen pressure level (by means of the computer 94) flows into the lifting cylinder 1. During this motion, the position sensor 90 will continuously emit position signals to the computer 94, which thereby automatically can compensate for changes of the moment as a consequence of the dead weight, such that a substantially constant ground pressure is maintained during the whole floating motion inwards and towards the excavator.

If instead, the floating motion is performed in the other direction, i.e. outwardly, the oil will have to be evacuated out of the lifting cylinder 1 via the line 45A. As the oil in this case cannot be allowed to flow into the accumulator 6, the oil entering into the reducing/relieving valve 4 has to be drained to the tank 42C, which takes place through line 4C. Also in this case it is the proportional valve 62A (controlled by the computer 94 which receives signals by the position sensor 90 and by the operator's control device), which controls the reducing/relieving valve 4 to provide the desired pressure level within the lifting cylinder 1.

In the computerized control system 94 there is preferably also an optimal power output function included, in accordance with what is disclosed in PCT/SE00/02360.

As is known, temperature variations may lead to operation problems. It is not unlikely that a certain mobile handling device, e.g. an excavator, at an occasion operates during heavy cold, wherein the gas temperature may be down to about −20° C., while the same handling equipment at another occasion operates in environment with extreme heat, wherein the gas temperature may amount to about +70° C. Thus, it may be the question of changes in temperature of almost 100° C. According to a preferred embodiment, a temperature sensor 95 is therefore provided, which sensor is connected to the gas phase within the accumulator 6. By means of said temperature sensor 95 and the computer 94 the hydraulic pump 71 may then be controlled to give a loading pressure within the accumulator 6 which is adapted to the gas temperature. The computer 94 then registers and treat the signal form the sensor 95 first to establish an optimal loading pressure depending on the temperature of the gas phase, and then to automatically cause the hydraulic pump 71 to give the desired loading pressure within the accumulator 6, i.e. about 112 bars (102 bars+10%) at a gas temperature of −20° C., if the calibration is set to 120 bars (+20° C.), which ensures that the system operates in a safe manner independent of the ambient temperature.

The invention is not limited to the above description but may varied within the scope of the appending claims. For example, it is evident that further position sensors may be included in the arm system, e.g. which also sense the position of the stick in relation to the boom, so that moment from the dead weight of the arm may be monitored with still greater precision in order to achieve automatic floating control by means of reducing/relieving valve 4 within the hydraulic circuit. Furthermore, it is realized that the invention is not limited to excavators but that it may be used in conjunction with all kinds of hydraulic machines having an arm systems consisting of two (or possibly more) parts, i.e. according to the principle boom/stick existing on excavators. Moreover, it should be understood that the invention is not limited to the above described integrated reducing/relieving valve 4 but that the described function may be obtained by means of corresponding valve parts which are not integrated, and that this kind of functionality may be achieved by other types of valve elements which are interconnected in order to achieve the same kind of function. Furthermore, it is evident that the pressure source may vary, e.g. to be in the form of a hydraulic pump instead of an accumulator 6.

What is claimed is:

1. A hydraulically powered arm system with a hydraulic circuit, which hydraulic circuit (L) comprises a pressure source (6) and a lifting cylinder (1) arranged to an arm which is intended for handling a tool, said hydraulic circuit (L) comprising a partial circuit (45A, 45B), which can be connected into communication with said pressure source (6) by means of a first valve element (44) and said lifting cylinder (1) by means of a second valve element (43), characterised in that said partial circuit (45A, 45B) comprises a pressure reducing/relieving unit (4) which is arranged between said valve elements (43, 44), and that said pressure reducing/relieving unit (4) is controlled by a pressure controlling unit (62A) in order to facilitate float control of the tool attached to the arm system, whereby a controlled ground pressure is obtained during the floating motion.

2. A system according to claim 1, characterised in that said pressure reducing/relieving unit (4) comprises a reducing/relieving valve (4), which is formed as an integral unit.

3. A system according to claim 1, characterised in that said pressure controlling unit (62A) comprises a proportional valve (62A).

4. A system according to claim 3, characterised in that said proportional valve (62A) receives signals directly or indirectly from a control device handled by the operator, such that the level of the pressure against the ground may be chosen within a certain range.

5. A system according to claim 4, characterised in that said proportional valve (62A) is controlled by a control unit (94), which besides signals from said control device also receives signals from a position sensor (90), whereby an automatic compensation for the position of the arm is achieved in order to obtain a substantially constant level of the pressure against the ground during a floating motion.

6. A system according to claim 1, characterised in that said pressure source (6) comprises an accumulator (6).

7. A system according to claim 6, characterised in that said accumulator (6) is included in a circuit for recovering and recycling, respectively, of lowering load energy, the hydraulic circuit also comprising a variable hydraulic machine (3) with two ports (10, 11), said hydraulic machine being able to give full system pressure in two flow directions to said ports, wherein one (11) of the ports is connected to said accumulator (6) and the other port (10) is connected to said lifting cylinder (1).

* * * * *